(12) United States Patent
Tse et al.

(10) Patent No.: US 10,402,698 B1
(45) Date of Patent: Sep. 3, 2019

(54) SYSTEMS AND METHODS FOR IDENTIFYING INTERESTING MOMENTS WITHIN VIDEOS

(71) Applicant: GoPro, Inc., San Mateo, CA (US)

(72) Inventors: Daniel Tse, San Mateo, CA (US); Desmond Chik, Mountain View, CA (US); Jonathan Wills, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 269 days.

(21) Appl. No.: 15/645,451

(22) Filed: Jul. 10, 2017

(51) Int. Cl.
*G06K 9/00* (2006.01)
*G06K 9/62* (2006.01)

(52) U.S. Cl.
CPC ....... *G06K 9/6298* (2013.01); *G06K 9/00718* (2013.01); *G06K 9/00765* (2013.01); *G06K 9/6267* (2013.01); *G06K 9/6296* (2013.01)

(58) Field of Classification Search
CPC .......... G06K 9/00718; G06K 9/00765; G06K 9/6267; G06K 9/6296; G06K 9/6298; G06K 2009/00738
See application file for complete search history.

(56) References Cited

U.S. PATENT DOCUMENTS

| | | |
|---|---|---|
| 6,633,685 B1 | 10/2003 | Kusama |
| 7,222,356 B1 | 5/2007 | Yonezawa |
| 7,483,618 B1 | 1/2009 | Edwards |
| 7,512,886 B1 | 3/2009 | Herberger |
| 7,885,426 B2 | 2/2011 | Golovchinsky |
| 7,970,240 B1 | 6/2011 | Chao |
| 8,180,161 B2 | 5/2012 | Haseyama |

(Continued)

FOREIGN PATENT DOCUMENTS

| | | |
|---|---|---|
| JP | H09181966 A | 7/1997 |
| JP | 2005252459 A | 9/2005 |

(Continued)

OTHER PUBLICATIONS

Deng et al. ("Semantic Analysis and Video Event Mining in Sports Video," 22nd International Conference on Advanced Information Networking and Applications — Workshops, Mar. 25-28, 2008) (Year: 2008).*

(Continued)

*Primary Examiner* — Yubin Hung
(74) *Attorney, Agent, or Firm* — Esplin & Associates, PC

(57) ABSTRACT

Video information defining video content may be accessed. The video content may have a progress length and include a capture of an activity and a sub-activity at one or more moments in the progress length. Portions of the video content may be associated individually with values of an interest metric such that the values of the interest metric as a function of progress through the video content form an interest curve for the video content. The activity and the sub-activity captured within the video content may be identified. An activity metric modifier for the interest curve at the one or more moments in the progress length may be determined based on the identification of the activity and the identification of the sub-activity. The interest curve may be modified at the one or more moments based on the activity metric modifier.

20 Claims, 5 Drawing Sheets

(56) References Cited

U.S. PATENT DOCUMENTS

| | | | |
|---|---|---|---|
| 8,326,786 B1* | 12/2012 | Martel | G06K 9/48 706/45 |
| 8,396,878 B2 | 3/2013 | Acharya | |
| 8,446,433 B1 | 5/2013 | Mallet | |
| 8,606,073 B2 | 12/2013 | Woodman | |
| 8,611,422 B1 | 12/2013 | Yagnik | |
| 8,612,463 B2 | 12/2013 | Brdiczka | |
| 8,718,447 B2 | 5/2014 | Yang | |
| 8,763,023 B1 | 6/2014 | Goetz | |
| 8,774,560 B2 | 7/2014 | Sugaya | |
| 8,971,623 B2 | 3/2015 | Gatt | |
| 8,990,328 B1 | 3/2015 | Grigsby | |
| 9,041,727 B2 | 5/2015 | Ubillos | |
| 9,077,956 B1 | 7/2015 | Morgan | |
| 9,142,257 B2 | 9/2015 | Woodman | |
| 9,253,533 B1 | 2/2016 | Morgan | |
| 9,342,376 B2 | 5/2016 | Jain | |
| 9,396,385 B2 | 7/2016 | Bentley | |
| 9,418,283 B1 | 8/2016 | Natarajan | |
| 2002/0165721 A1 | 11/2002 | Chang | |
| 2004/0001706 A1 | 1/2004 | Jung | |
| 2004/0128317 A1 | 7/2004 | Sull | |
| 2005/0025454 A1 | 2/2005 | Nakamura | |
| 2005/0108031 A1 | 5/2005 | Grosvenor | |
| 2005/0198018 A1 | 9/2005 | Shibata | |
| 2006/0080286 A1 | 4/2006 | Svendsen | |
| 2006/0115108 A1 | 6/2006 | Rodriguez | |
| 2007/0204310 A1 | 8/2007 | Hua | |
| 2007/0230461 A1 | 10/2007 | Singh | |
| 2008/0044155 A1 | 2/2008 | Kuspa | |
| 2008/0123976 A1 | 5/2008 | Coombs | |
| 2008/0131853 A1* | 6/2008 | Kunitz | A63B 71/0605 434/250 |
| 2008/0152297 A1 | 6/2008 | Ubillos | |
| 2008/0163283 A1 | 7/2008 | Tan | |
| 2008/0177706 A1 | 7/2008 | Yuen | |
| 2008/0183843 A1 | 7/2008 | Gavin | |
| 2008/0253735 A1 | 10/2008 | Kuspa | |
| 2008/0292273 A1* | 11/2008 | Wang | H04N 5/76 386/249 |
| 2008/0313541 A1 | 12/2008 | Shafton | |
| 2009/0019995 A1 | 1/2009 | Miyajima | |
| 2009/0125559 A1 | 5/2009 | Yoshino | |
| 2009/0213270 A1 | 8/2009 | Ismert | |
| 2009/0252474 A1 | 10/2009 | Nashida | |
| 2010/0046842 A1 | 2/2010 | Conwell | |
| 2010/0086216 A1 | 4/2010 | Lee | |
| 2010/0104261 A1 | 4/2010 | Liu | |
| 2010/0183280 A1 | 7/2010 | Beauregard | |
| 2010/0199182 A1 | 8/2010 | Lanza | |
| 2010/0231730 A1 | 9/2010 | Ichikawa | |
| 2010/0245626 A1 | 9/2010 | Woycechowsky | |
| 2010/0251295 A1 | 9/2010 | Amento | |
| 2010/0274714 A1 | 10/2010 | Sims | |
| 2010/0278504 A1 | 11/2010 | Lyons | |
| 2010/0278509 A1 | 11/2010 | Nagano | |
| 2010/0281375 A1 | 11/2010 | Pendergast | |
| 2010/0281386 A1 | 11/2010 | Lyons | |
| 2010/0318660 A1 | 12/2010 | Balsubramanian | |
| 2011/0075990 A1 | 3/2011 | Eyer | |
| 2011/0093798 A1 | 4/2011 | Shahraray | |
| 2011/0103700 A1 | 5/2011 | Haseyama | |
| 2011/0137156 A1 | 6/2011 | Razzaque | |
| 2011/0170086 A1 | 7/2011 | Oouchida | |
| 2011/0206351 A1 | 8/2011 | Givoly | |
| 2011/0242098 A1 | 10/2011 | Tamaru | |
| 2011/0293250 A1 | 12/2011 | Deever | |
| 2012/0014673 A1 | 1/2012 | O'Dwyer | |
| 2012/0027381 A1 | 2/2012 | Kataoka | |
| 2012/0030029 A1 | 2/2012 | Flinn | |
| 2012/0057852 A1 | 3/2012 | Devleeschouwer | |
| 2012/0123780 A1 | 5/2012 | Gao | |
| 2012/0141019 A1 | 6/2012 | Zhang | |
| 2012/0210205 A1 | 8/2012 | Sherwood | |
| 2012/0246114 A1 | 9/2012 | Edmiston | |
| 2012/0283574 A1 | 11/2012 | Park | |
| 2012/0311448 A1 | 12/2012 | Achour | |
| 2013/0040660 A1* | 2/2013 | Fisher | G06Q 30/02 455/456.1 |
| 2013/0136193 A1 | 5/2013 | Hwang | |
| 2013/0151970 A1 | 6/2013 | Achour | |
| 2013/0166303 A1 | 6/2013 | Chang | |
| 2013/0182166 A1 | 7/2013 | Shimokawa | |
| 2013/0195429 A1 | 8/2013 | Fay | |
| 2013/0197967 A1 | 8/2013 | Pinto | |
| 2013/0208942 A1 | 8/2013 | Davis | |
| 2013/0235071 A1 | 9/2013 | Ubillos | |
| 2013/0239051 A1 | 9/2013 | Albouze | |
| 2013/0259390 A1 | 10/2013 | Dunlop | |
| 2013/0259399 A1 | 10/2013 | Ho | |
| 2013/0282747 A1 | 10/2013 | Cheng | |
| 2013/0283301 A1 | 10/2013 | Avedissian | |
| 2013/0287214 A1 | 10/2013 | Resch | |
| 2013/0300939 A1 | 11/2013 | Chou | |
| 2013/0318443 A1 | 11/2013 | Bachman | |
| 2013/0330019 A1 | 12/2013 | Kim | |
| 2013/0343727 A1 | 12/2013 | Rav-Acha | |
| 2014/0072285 A1 | 3/2014 | Shynar | |
| 2014/0093164 A1 | 4/2014 | Noorkami | |
| 2014/0096002 A1 | 4/2014 | Dey | |
| 2014/0105573 A1 | 4/2014 | Hanckmann | |
| 2014/0149865 A1 | 5/2014 | Tanaka | |
| 2014/0152762 A1 | 6/2014 | Ukil | |
| 2014/0161351 A1 | 6/2014 | Yagnik | |
| 2014/0165119 A1 | 6/2014 | Liu | |
| 2014/0169766 A1 | 6/2014 | Yu | |
| 2014/0212107 A1 | 7/2014 | Saint-Jean | |
| 2014/0219634 A1 | 8/2014 | McIntosh | |
| 2014/0226953 A1 | 8/2014 | Hou | |
| 2014/0232818 A1 | 8/2014 | Carr | |
| 2014/0245336 A1 | 8/2014 | Lewis, II | |
| 2014/0282661 A1 | 9/2014 | Martin | |
| 2014/0300644 A1 | 10/2014 | Gillard | |
| 2014/0328570 A1 | 11/2014 | Cheng | |
| 2014/0334796 A1 | 11/2014 | Galant | |
| 2014/0341528 A1 | 11/2014 | Mahate | |
| 2014/0366052 A1 | 12/2014 | Ives | |
| 2015/0015680 A1 | 1/2015 | Wang | |
| 2015/0022355 A1 | 1/2015 | Pham | |
| 2015/0029089 A1 | 1/2015 | Kim | |
| 2015/0039646 A1 | 2/2015 | Sharifi | |
| 2015/0067811 A1 | 3/2015 | Agnew | |
| 2015/0071547 A1 | 3/2015 | Keating | |
| 2015/0113009 A1 | 4/2015 | Zhou | |
| 2015/0156247 A1 | 6/2015 | Hensel | |
| 2015/0186073 A1 | 7/2015 | Pacurariu | |
| 2015/0287435 A1 | 10/2015 | Land | |
| 2015/0318020 A1 | 11/2015 | Pribula | |
| 2015/0373281 A1 | 12/2015 | White | |
| 2015/0375117 A1 | 12/2015 | Thompson | |
| 2015/0382083 A1 | 12/2015 | Chen | |
| 2016/0005440 A1 | 1/2016 | Gower | |
| 2016/0026874 A1 | 1/2016 | Hodulik | |
| 2016/0027470 A1 | 1/2016 | Newman | |
| 2016/0027475 A1 | 1/2016 | Hodulik | |
| 2016/0029105 A1 | 1/2016 | Newman | |
| 2016/0034786 A1* | 2/2016 | Suri | G06K 9/6256 382/159 |
| 2016/0055885 A1 | 2/2016 | Hodulik | |
| 2016/0078119 A1* | 3/2016 | Aravkin | G06F 16/285 707/738 |
| 2016/0094601 A1 | 3/2016 | Besehanic | |
| 2016/0103830 A1 | 4/2016 | Cheong | |
| 2016/0105308 A1* | 4/2016 | Dutt | G06N 3/0472 |
| 2016/0110877 A1* | 4/2016 | Schwartz | G06T 7/20 382/107 |
| 2016/0189752 A1 | 6/2016 | Galant | |
| 2016/0225405 A1 | 8/2016 | Matias | |
| 2016/0225410 A1 | 8/2016 | Lee | |
| 2016/0234345 A1 | 8/2016 | Roberts | |
| 2016/0260000 A1 | 9/2016 | Yamakawa | |
| 2016/0286235 A1 | 9/2016 | Yamamoto | |
| 2016/0292881 A1 | 10/2016 | Bose | |
| 2016/0358603 A1 | 12/2016 | Azam | |

(56) References Cited

U.S. PATENT DOCUMENTS

| | | | |
|---|---|---|---|
| 2016/0366330 A1 | 12/2016 | Boliek | |
| 2017/0185846 A1* | 6/2017 | Hwangbo | G06K 9/00751 |
| 2017/0255831 A1* | 9/2017 | Bernal | G06K 9/00751 |
| 2017/0336922 A1* | 11/2017 | Vaskevitch | G06F 3/0481 |

FOREIGN PATENT DOCUMENTS

| | | |
|---|---|---|
| JP | 2006053694 | 2/2006 |
| JP | 2006053694 A | 2/2006 |
| JP | 2008059121 A | 3/2008 |
| JP | 2009053748 A | 3/2009 |
| JP | 2011188004 | 9/2011 |
| JP | 2011188004 A | 9/2011 |
| WO | 2006001361 A1 | 1/2006 |
| WO | 2009040538 | 4/2009 |
| WO | 2012057623 | 5/2012 |
| WO | 2012057623 A1 | 5/2012 |
| WO | 2012086120 A1 | 6/2012 |

OTHER PUBLICATIONS

Cui et al. ("A Novel Event-Oriented Segment-of-Interest Discovery Method for Surveillance Video," IEEE International Conference on Multimedia and Expo, Jul. 2-5, 2007) (Year: 2007).*

Chen et al. ("Movie emotional event detection based on music mood and video tempo," Digest of Technical Papers International Conference on Consumer Electronics, Jan. 7-11, 2006 (Year: 2006).*

PCT International Written Opinion for PCT/US2015/041624, dated Dec. 17, 2015, 7 Pages.

PCT International Search Report and Written Opinion for PCT/US15/12086 dated Mar. 17, 2016, 20 pages.

Schroff et al., "FaceNet: A Unified Embedding for Face Recognition and Clustering," IEEE Conference on Computer Vision and Pattern Recognition (CVPR), 2016, 10 pgs.

Parkhi et al., "Deep Face Recognition," Proceedings of the British Machine Vision, 2015, 12 pgs.

Iandola et al., "SqueezeNet: AlexNet-level accuracy with 50x fewer parameters and <0.5MB model size," arXiv:1602.07360, 2016, 9 pgs.

Ioffe et al., "Batch Normalization: Accelerating Deep Network Training by Reducing Internal Covariate Shift," arXiv:1502.03167, 2015, 11 pgs.

He et al., "Deep Residual Learning for Image Recognition," arXiv:1512.03385, 2015, 12 pgs.

Han et al., Deep Compression: Compressing Deep Neural Networks with Pruning, Trained Quantization and Huffman Coding, International Conference on Learning Representations 2016, 14 pgs.

PCT International Search Report and Written Opinion for PCT/US2015/023680, dated Oct. 6, 2015, 13 pages.

Iandola et al., "SqueezeNet: AlexNet-level accuracy with 50x fewer parameters and <0.5MB model size", arXiv:1602.07360v3 [cs.CV] Apr. 6, 2016 (9 pgs.).

Yang et al., "Unsupervised Extraction of Video Highlights via Robust Recurrent Auto-encoders" arXiv:1510.01442v1 [cs.CV] Oct. 6, 2015 (9 pgs).

Tran et al., "Learning Spatiotemporal Features with 3D Convolutional Networks", arXiv:1412.0767 [cs.CV] Dec. 2, 2014 (9 pgs).

PCT International Search Report for PCT/US15/41624 dated Nov. 4, 2015, 5 pages.

PCT International Search Report for PCT/US15/23680 dated Aug. 3, 2015, 4 pages.

PSonar URL: http://www.psonar.com/about retrieved on Aug. 24, 2016, 3 pages.

PCT International Preliminary Report on Patentability for PCT/US2015/023680, dated Oct. 4, 2016, 10 pages.

Nicole Lee, Twitter's Periscope is the best livestreaming video app yet; Mar. 26, 2015 URL:http://www.engadget.com/2015/03/26/periscope/ [Retrieved Aug. 25, 2015] 11 pages.

FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.

FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.

Japanese Office Action for JP Application No. 2013-140131, dated Aug. 5, 2014, 6 pages.

Office Action for U.S. Appl. No. 13/831,124, dated Mar. 19, 2015, 14 pages.

Ernoult, Emeric, "How to Triple Your YouTube Video Views with Facebook", SocialMediaExaminer.com, Nov. 26, 2012, 16 pages.

* cited by examiner

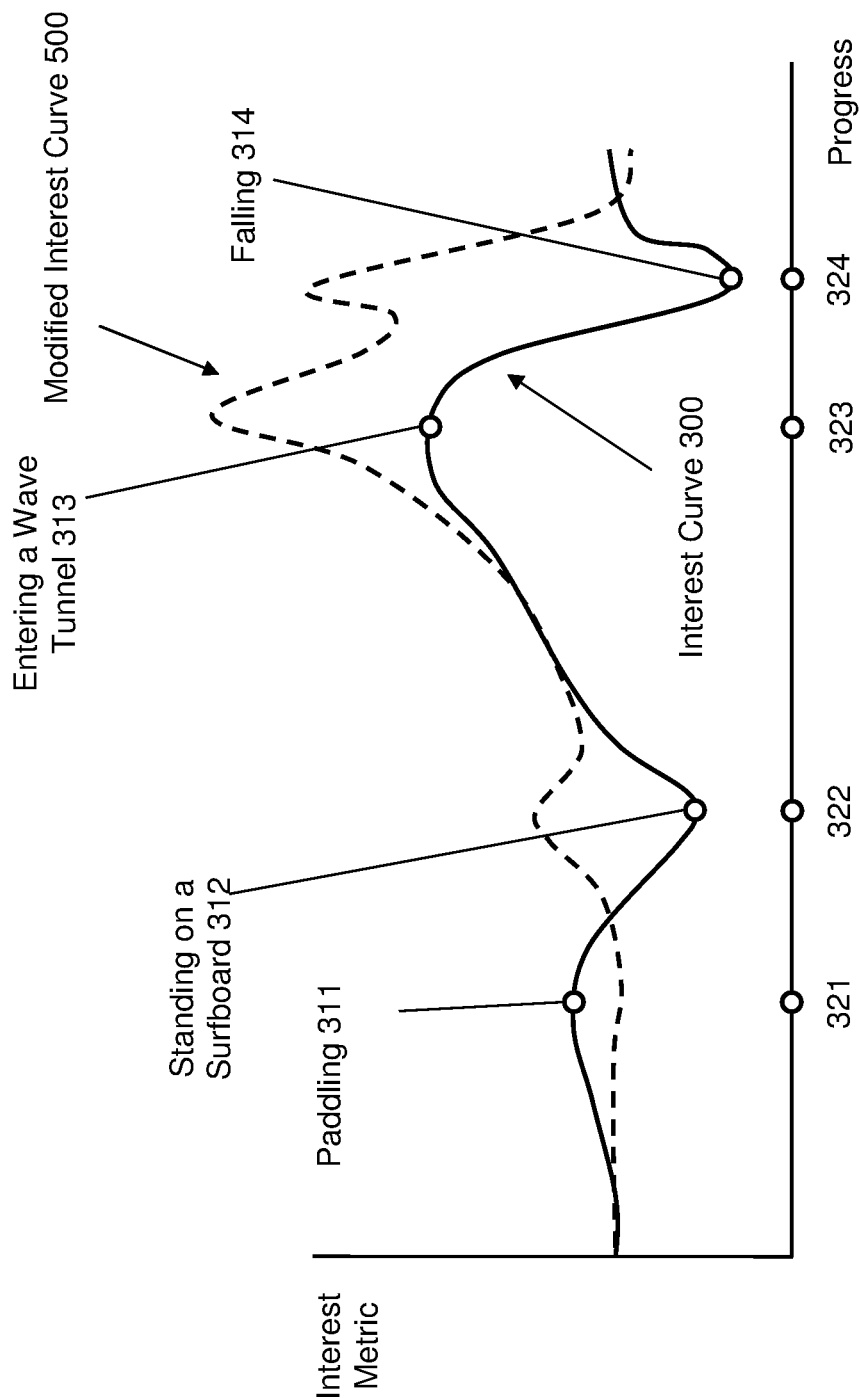

SYSTEMS AND METHODS FOR IDENTIFYING INTERESTING MOMENTS WITHIN VIDEOS

FIELD

This disclosure relates to modifying an interest curve that quantities interesting moments within videos based on activities and sub-activities captured within the videos.

BACKGROUND

Manually identifying interesting moments within videos for video summary generation may be difficult and time consuming. Improving automatic identification of interesting moments within videos may encourage capture/use/share of the videos.

SUMMARY

This disclosure relates to identifying interesting moments within videos. Video information defining video content may be accessed. The video content may have a progress length and include a capture of an activity at one or more moments in the progress length. The capture of the activity may include a capture of a sub-activity associated with the activity. Portions of the video content may be associated individually with values of an interest metric such that the values of the interest metric of the individual portions of the video content as a function of progress through the video content form an interest curve for the video content. The activity captured within the video content may be identified. The sub-activity captured within the video content may be identified based on the identification of the activity. An activity metric modifier for the interest curve at the one or more moments in the progress length may be determined based on the identification of the activity and the identification of the sub-activity. The interest curve may be modified at the one or more moments based on the activity metric modifier.

A system that identifies interesting moments within videos may include one or more processors, and/or other components. The processor(s) may be configured by machine-readable instructions. Executing the machine-readable instructions may cause the processor(s) to facilitate identifying interesting moments within videos. The machine-readable instructions may include one or more computer program components. The computer program components may include one or more of a video information component, an activity component, a metric component, an interest curve component and/or other computer program components. In some implementations, the computer program components may include an emotion component and an orientation component.

The video information component may be configured to access video information defining video content. Accessing the video information may include one or more of acquiring, analyzing, determining, examining, locating, obtaining, receiving, retrieving, reviewing, and/or otherwise accessing the video information. The video information component may access video information from one or more locations. The video information component may be configured to access video information defining video content during capture of the video content and/or after capture of the video content by one or more image sensors.

Video content may refer to media content that may be consumed as one or more videos. Video content may include one or more videos stored in one or more formats/container, and/or other video content. Video content may have a progress length. Video content may include a capture of an activity at one or more moments in the progress length. The capture of the activity may include a capture of a sub-activity associated with the activity. In some implementations, video content may include one or more of spherical video content, virtual reality content, and/or other video content.

Portions of the video content may be associated individually with values of an interest metric. The values of the interest metric of the individual portions of the video content as a function of progress through the video content may form an interest curve for the video content. The video content may include video frames. In some implementations, the portions of the video content being associated individually with values of the interest metric may include the video frames being associated individually with the values of the interest metric.

The activity component may be configured to identify the activity captured within the video content. In some implementations, the activity may be identified with an activity accuracy.

The activity component may be configured to identify the sub-activity captured within the video content based on the identification of the activity and/or other information. In some implementations, the sub-activity may be identified with a sub-activity accuracy. In some implementations, the identification of the sub-activity may be characterized by a probability distribution and/or other information. In some implementations, the probability distribution may include identification of a set of sub-activities associated with the activity, accuracies associated with the identification of individual sub-activities, and/or other information. In some implementations, the probability distribution may characterized by a degree of unimodality.

The emotion component may be configured to identify an emotion captured within the video content at the one or more moments in the progress length. In some implementations, the emotion may be identified with an emotion accuracy. In some implementations, the identification of the emotion may be characterized by a probability distribution and/or other information.

The orientation component may be configured to determine an orientation of an image sensor and/or other information. The image sensor may have captured the video content. The orientation component may determine the orientation of the image sensor when the image sensor captured the activity at the one or more moments in the progress length.

The metric component may be configured to determine an activity metric modifier for the interest curve at the one or more moments in the progress length based on one or more of the identification of the activity, the identification of the sub-activity, and/or other information. In some implementations, the activity metric modifier may be determined further based on the activity accuracy of the activity identification and the sub-activity accuracy of the sub-activity identification. In some implementations, the activity metric modifier may be determined further based on the probability distribution of the sub-activity identification. In some implementations, the individual sub-activities may be associated with individual modifier values and/or other information. In some implementations, the activity metric modifier may be determined further based on the degree of unimodality of the probability distribution of the sub-activity identification.

In some implementations, the metric component may be configured to determine an emotion metric modifier for the interest curve at the one or more moments in the progress length based on the emotion captured within the video content and/or other information. In some implementations, the emotion metric modifier may be determined further based on the emotion accuracy of the emotion identification and the probability distribution of the emotion identification.

In some implementations, the metric component may be configured to determine an orientation metric modifier for the interest curve at the one or more moments in the progress length based on the orientation of the image sensor that captured the video content and/or other information.

The interest curve component may be configured to modify the interest curve at the one or more moments based on the activity metric modifier and/or other information. In some implementations, the interest curve component may be configured to modify the interest curve at the one or more moments further based on the emotion metric modifier. In some implementations, the interest curve component may be configured to modify the interest curve at the one or more moments further based on the orientation metric modifier.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 5 illustrates an example modified interest curve.

DETAILED DESCRIPTION

Figure 1:
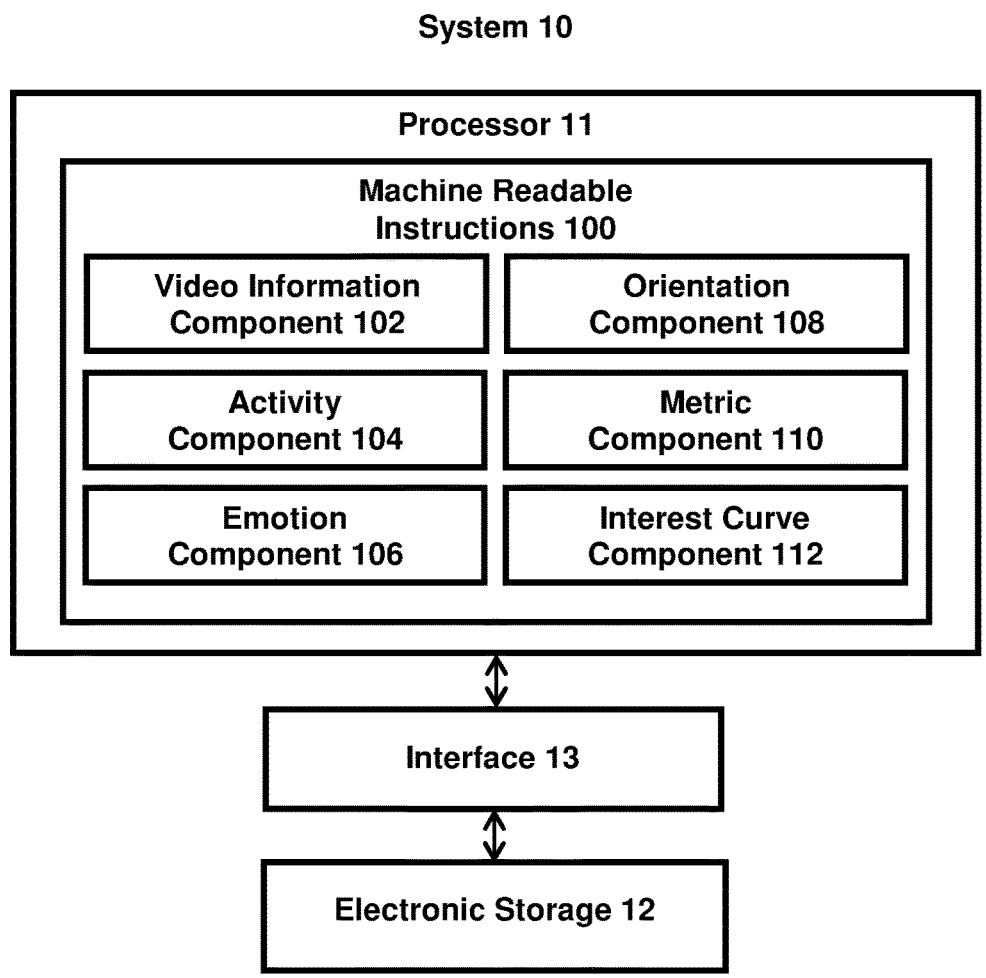
FIG. 1 illustrates an example system that identifies interesting moments within videos.

FIG. 1 illustrates a system 10 for identifying interesting moments within videos. The system 10 may include one or more of a processor 11, an electronic storage 12, an interface 13 (e.g., bus, wireless interface), and/or other components. Video information defining video content may be accessed by the processor 11. The video content may have a progress length and include a capture of an activity at one or more moments in the progress length. The capture of the activity may include a capture of a sub-activity associated with the activity. Portions of the video content may be associated individually with values of an interest metric such that the values of the interest metric of the individual portions of the video content as a function of progress through the video content form an interest curve for the video content. The activity captured within the video content may be identified. The sub-activity captured within the video content may be identified based on the identification of the activity. An activity metric modifier for the interest curve at the one or more moments in the progress length may be determined based on the identification of the activity and the identification of the sub-activity. The interest curve may be modified at the one or more moments based on the activity metric modifier.

The electronic storage 12 may be configured to include electronic storage medium that electronically stores information. The electronic storage 12 may store software algorithms, information determined by the processor 11, information received remotely, and/or other information that enables the system 10 to function properly. For example, the electronic storage 12 may store information relating to video information, video content, interest metric, interest curve, activity, sub-activity, activity/sub-activity identification, emotion, emotion identification, image sensor orientation, image sensor orientation identification, activity metric modifier, emotion metric modifier, orientation metric modifier, and/or other information.

Referring to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine readable instructions 100 to facilitate identifying interesting moments within videos. The machine readable instructions 100 may include one or more computer program components. The machine readable instructions 100 may include one or more of a video information 102 component, an activity 104 component, a metric 110 component, an interest curve component 112 and/or other computer program components. In some implementations, the computer program components may include an emotion component 106 and/or an orientation component 108.

The video information component 102 may be configured to access video information and/or other information. The video information may define video content. Accessing the video information may include one or more of acquiring, analyzing, determining, examining, locating, obtaining, receiving, retrieving, reviewing, and/or otherwise accessing the video information. The video information component 102 may access video information from one or more locations. For example, the video information component 102 may access the video information from a storage location, such as the electronic storage 12, electronic storage of one or more image sensors (not shown in FIG. 1), electronic storage of a device accessible via a network, and/or other locations. The video information component 102 may access the video information from one or more hardware components (e.g., an image sensor) and/or one or more software components (e.g., software running on a computing device). Other locations from which the video information are accessed are contemplated.

The video information component 102 may be configured to access video information defining video content during capture of the video content and/or after capture of the video content by one or more image sensors. For example, the video information component 102 may access video information defining video content while the video content is being captured by one or more image sensors. The video information component 102 may access video information defining video content after the video content has been captured and stored in memory (e.g., the electronic storage 12, buffer memory).

Video content may refer to media content that may be consumed as one or more videos. Video content may include one or more videos stored in one or more formats/container, and/or other video content. A video may include a video clip captured by a video capture device, multiple video clips captured by a video capture device, and/or multiple video clips captured by separate video capture devices. A video may include multiple video clips captured at the same time and/or multiple video clips captured at different times. A video may include a video clip processed by a video application, multiple video clips processed by a video application and/or multiple video clips processed by separate video applications.

Video content may have a progress length. A progress length may be defined in terms of time durations and/or frame numbers. For example, video content may include a video having a time duration of 60 seconds. Video content may include a video having 1800 video frames. Video content having 1800 video frames may have a play time duration of 60 seconds when viewed at 30 frames/second. Other time durations and frame numbers are contemplated.

Video content may include a capture of one or more activities at one or more moments in the progress length. For example, video content may include a capture of a surfing activity that spans a duration in the progress length of the video content. The capture of an activity may include a capture of one or more sub-activities associated with the activity. For example, a surfing activity may be associated with one or more sub-activities, such as paddling, standing on a surfboard, performing a trick, entering a wave tunnel, surfing in a particular way, falling in a particular way, and/or other sub-activities. A capture of a surfing activity may include capture of one or more sub-activities associated with surfing. Other types of activities and sub-activities are contemplated.

Portions of the video content may be associated individually with values of one or more interest metrics. Portions of the video content may include one or more video frames of the video content. An interest metric may refer to one or more measurements indicating whether portions of the video content include capture of visuals that are of interest to one or more users. Capture of visuals may include capture of one or more objects (e.g., animate/inanimate objects), scenes, actions, and/or other visuals. Values of the Interest metric(s) may be measured in numbers, characters, and/or other measurements. In some implementations, values of interest metric(s) may be determined based on analysis of the visual, audio, and/or other information relating to the capture of the video content. Analysis of the visual, audio, and/or other information may be performed using the video content and/or reduced versions of the video content (e.g., having lower resolution, lower framerate, higher compression).

In some implementations, values of the interest metric(s) may indicate one or more measurements of one or more characteristics of the portions of the video content that quantifies user interest. For example, values of the interest metric(s) may indicate measurement(s) of intensities of visuals and/or audios captured within the portions, activities/events captured within the portions, and/or other information. Other measurements are contemplated.

In some implementations, values of the interest metric(s) may indicate a probability that the portions of the video content include a visual/audio capture of a particular visual, a particular object, a particular scene, a particular action, a particular activity, and/or other information. For example, values of the interest metric(s) may indicate a probability that the portion of the video content includes a particular person, a particular movement, a particular sporting event, a particular emotion (e.g., laughing, smiling, excited), and/or other information. Other probabilities are contemplated.

Values of the interest metric(s) may provide a "goodness" measure that is agnostic as to the particular visuals, objects, scenes, action, and/or activities captured within the video content. Values of the interest metric(s) may provide a measure that indicates whether the visuals captured within the video content are those that are of likely to be of interest to a user regardless of the particular visuals, objects, scenes, action, and/or activities captured within the video content. For example, a "goodness" measure may indicate the extent to which the video content includes visuals with particular brightness, contrast, color histogram, blur/sharpness, number of faces, particular faces, salient object, smooth motion, steady shot vs. shakiness, scene composition, framing and/or other measures that indicates "goodness" regardless of the activity captured within the video content.

Values of the interest metric(s) providing a "goodness" measure may provide a base measure of interest in the video content. Criteria for determining general "goodness" in video content may not identify relevant moments (e.g., highlight moments, moments of interest) for particular visuals, objects, scenes, action, and/or activities. For example, a "goodness" measure (base measure of interest) may not identify relevant moments for a surfing activity. Falling in a spectacular way may be of interest in a surfing activity, but the motion associated with such falls may lead to the corresponding portion of the video content having poor "goodness"/base measure.

Figure 3:
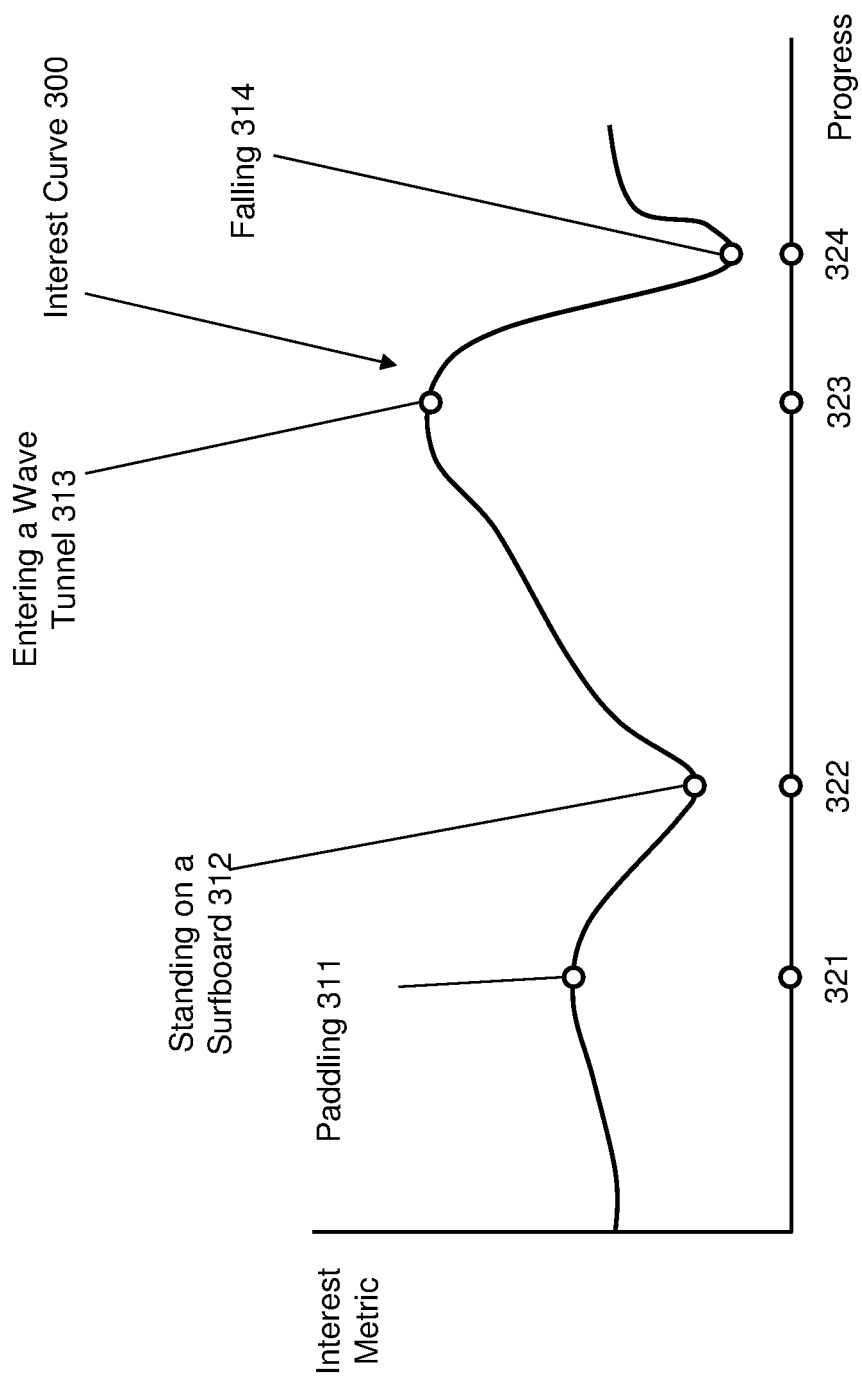
FIG. 3 illustrates an example interest curve.

The values of the interest metric of the individual portions of the video content as a function of progress through the video content may form an interest curve for the video content. For example, FIG. 3 illustrates an example interest curve 300. The interest curve 300 may be scored on a scale (e.g., 1-100, 0-1) based on interest metrics of the different portions of the video content. Other interest curves are contemplated.

In some implementations, the portions of the video content being associated individually with values of the interest metric may include video frames of the video content being associated individually with the values of the interest metric. For example, referring to FIG. 3, the interest curve 300 may be defined by interest metrics values of individual video frames of video content. In some implementations, some portions of the video content may be associated with interest metrics by individual video frames and other portion of the video content may be associated with interest metrics by groups of video frames.

As shown in FIG. 3, the interest curve 300 may be scored based on one or more general "goodness" measures. Higher values of the interest curve 300 may indicate that the corresponding portion of the video content includes visual capture that are generally more of interest to users, regardless of the particular visuals, objects, scenes, action, and/or activities captured within the video content. For example, the video content characterized by the interest curve 300 may include a capture of a surfing activity. The capture of the surfing activity may include capture of sub-activities associated with surfing, such as paddling, standing on a surfboard, performing a trick, entering a wave tunnel, surfing in a particular way, falling in a particular way, and/or other sub-activities. For example, FIG. 3 illustrates the different sub-activities captured within the video content characterized by the interest curve 300 as a function of progress through the video content: paddling 311 (at moment 321); standing on a surfboard 312 (at moment 322); entering a wave tunnel 313 (at moment 323); and falling 314 (at moment 324). Based on the general "goodness" criteria, the interest curve 300 may include lower interest metric values for standing on a surfboard 312 and falling 314 than paddling 311, when both standing on a surfboard 312 and falling 314 would be of more interest to a user than paddling 311 during the surfing activity.

The activity component 104 may be configured to identify one or more activities and one or more sub-activity captured within the video content. The activity component 104 may identify one or more sub-activities captured within the video content based on the identification of the activity and/or other information. Analysis of the video content for activity/sub-activity identification may be performed using the video content and/or reduced versions of the video content (e.g., having lower resolution, lower framerate, higher compression). The activities and sub-activities may be identified using computer vision and/or other techniques.

For example, activities may be identified using a coarse-grained classifier and sub-activities may be identified using a fine-grained classifier. A coarse-grained classifier may provide one or more predictions of what activities/types of activities are captured within the video content and a fine-grained classifier may provide one or more predictions of what sub-activities/types of sub-activities are captured within the video content. An activity may be associated with a fine-grained classifier for identifying sub-activities associated with the activity. Based on the most likely activity captured within the video content, the fine-grained classifier associated the most likely activity may be used to identify the sub-activities. For example, referring to FIG. 3, the activity component 104 may have identified the most likely activity within the video content to be a surfing activity. Based on the identification of the surfing activity, the activity component 104 may identify the sub-activities shown in FIG. 3 via a fine-grained classifier associated with surfing activity (paddling 311; standing on a surfboard 312; entering a wave tunnel 313; and falling 314).

Identification of the activities/sub-activities captured within the video content may be performed on a per-frame basis and/or a per-group-of-frames basis. For example, identification of the activities/sub-activities captured within the video content may be performed on per a "time slice" of the video content, where a time slice represents a certain number of frames/duration. For example, a time slice may represent ten frames and/or a sixth of a second. Other times slices are contemplated.

In some implementations, exponential moving average/smoothing may be used for identification of the activities/sub-activities captured within the video content. Using exponential moving average/smoothing may prevent the coarse and/or fine-grained classifiers from jumping between identification of different activities/sub-activities. For example, without the use of the exponential moving average/smoothing, the classifiers may jump between identification of activity captured within video content as mounting biking to surfing, then back from surfing to mountain biking.

The activities and/or sub-activities may be identified with a given amount of accuracy (activity accuracy, sub-activity accuracy). Accuracy may indicate probability of the prediction of the activity/sub-activity identification being correct. For example, a surfing activity within video content may be identified with certain amount of accuracy (e.g., 60%). The sub-activities within the video content may be identified with certain amount(s) of accuracy.

Figure 4:
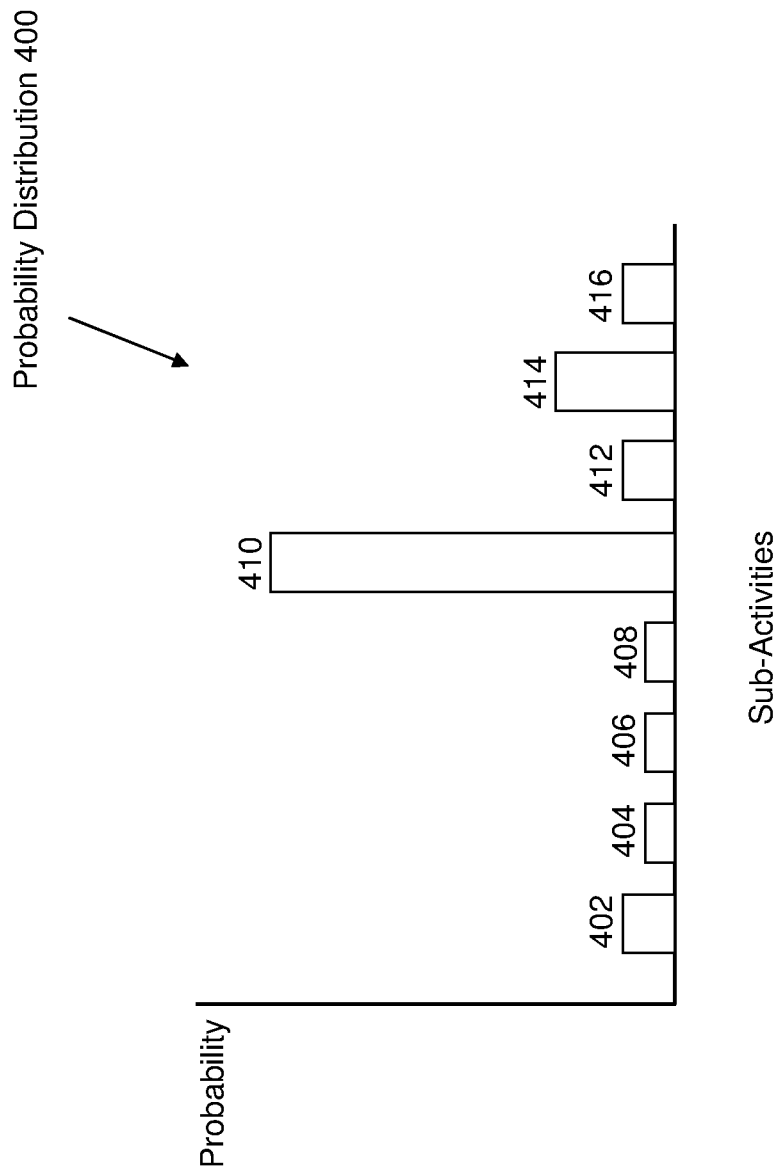
FIG. 4 illustrates example probability distribution for identification of sub-activities.

In some implementations, the identification of the sub-activities may be characterized by a probability distribution and/or other information. The probability distribution may include identification of a set of sub-activities associated with the activity, accuracies associated with the identification of individual sub-activities, and/or other information. For example, FIG. 4 illustrates an example probability distribution 400 for identification of sub-activities at moment 322. The probability distribution 400 includes different probabilities of prediction for different sub-activities identified at moment 322 (point/duration) in the progress of the video content. The probability of prediction for the sub-activity standing on a surfboard 312 may be shown in the probability distribution 400 by a bar 410. As shown in FIG. 4, the bar 410 has a greater probability (greater predicted accuracy of identification) than bars 402, 404, 406, 408, 412, 414, 416 for other sub-activities. The probability distribution 400 may indicate that for the moment 322 in the progress of the video content, the activity component 104 identified eight potential sub-activities associated with the surfing activity as being captured within the video content, and that the sub-activity identified with the highest accuracy (highest likelihood of occurring at moment 322) was the sub-activity standing on a surfboard 312 (the bar 410).

A probability distribution may characterized by a degree of unimodality and/or other information. A degree of unimodality may indicate the extent to which the probability distribution includes a unique mode (only a single highest/maximum value). For example, a probability distribution including probability values for eight different sub-activities may have a smaller degree of unimodality than a probability distribution including probability values for four different sub-activities.

The emotion component 106 may be configured to identify one or more emotions captured within the video content at one or more moments in the progress length. Analysis of the video content for emotion identification may be performed using the video content and/or reduced versions of the video content (e.g., having lower resolution, lower framerate, higher compression). The emotions may be identified using computer vision and/or other techniques. For example, faces captured within the video content may be detected to determine bounding boxes for the faces. Visuals within the individual bounding boxes may be fed through one or more neural networks to obtain prediction of emotions captured within the video content. Different types of emotions may be identified by the emotion component 106. As a non-limiting example, the emotion component 106 may be configured to identify anger, disgust, fear, happy, sad, surprise, neutral, and/or other emotions.

For example, the emotion component 106 may identify emotion(s) expressed by people captured within the video content at the moment 322 and/or other moments. The emotions may be identified with given amounts of accuracy (emotion accuracy). In some implementations, the identification of the emotions may be characterized by a probability distribution and/or other information. The probability distribution may include identification of a set of emotions, and/or other information. The probability distribution may include different probabilities of prediction for different emotions identified at the moment in the progress of the video content.

The orientation component 108 may be configured to determine one or more orientations of one or more image sensors and/or other information. The image sensor(s) may have captured the video content. The orientation component 108 may determine the orientation of the image sensor(s) when the image sensor(s) captured the activities/sub-activities at one or more moments in the progress length. The orientation component 108 may determine the orientation of the image sensor(s) based on sensor information (e.g., orientation sensor, accelerometer, gyroscope) generated at the particular moments, and/or based on analysis of the visuals captured within the video content (e.g., detection and orientation of horizon) at the particular moments.

The metric component 110 may be configured to determine one or more activity metric modifiers for the interest curve at one or more moments in the progress length based on one or more of the identification of the activity, the identification of the sub-activity, and/or other information. For example, referring to FIG. 3, the metric component 110 may determine one or more activity metric modifiers for the interest curve 300 based on the identification of the surfing activity. The activity metric modifier(s) may be further determined based on identification of the sub-activities at different moments in the progress length of the video content: padding 311 at moment 321, standing on a surfboard 312 at moment 322, entering a wave tunnel 313 at moment 323, and falling 314 and moment 324. In some implementations, individual activities may be associated with individual modifier values and/or other information. In some implementations, individual sub-activities may be associated with individual modifier values and/or other information. In some implementations, activity metric modifier(s) may be determined further based on the accuracy of the activity identification (activity accuracy) and the accuracy of the sub-activity identification (sub-activity accuracy). In some implementations, activity metric modifier(s) may be determined further based on the probability distribution of the sub-activity identification. In some implementations, activity metric modifier(s) may be determined further based on the degree of unimodality of the probability distribution of the sub-activity identification.

An activity metric modifier may include a parameter that decreases the values of an interest curve based on the activity accuracy and/or other information, and a parameter that increases the value of the interest curve based on one or more of the activity accuracy, identification of the sub-activities, sub-activity accuracy, and the degree of unimodality of the identified sub-activities probability distribution. For example, values of an interest curve modified by an activity metric modifier may be given by I'=(1−maxC)·I+maxC·A, where I'=modified interest curve value; I=original interest curve value (e.g., base measure of interest); maxC=the highest predicted activity (e.g., maximum prediction accuracy of the captured activity from the coarse-grained classifier, for example, 0.60 for 60% accuracy in prediction of a surfing activity); and A=activity-specific modifier value.

The modified interest curve values may be an interpolation between the original interest curve value (e.g., base measure of interest) and one or more values that boost or suppress the original values. An activity metric modifier may modify the values of the interest curve such that (1) higher probability of activity identification (maxC) results in greater impact on the modified interest curve values by the particular activity-specific modifier value (A) and lower impact on the modified interest curve values by the original interest curve values (I); and (2) lower probability of activity identification (maxC) results in lower impact on the modified interest curve values by the particular activity-specific modifier value (A) and greater impact on the modified interest curve values by the original interest curve values (I).

For example, if no activities were identified at a particular moment in the video content, the value of the interest curve at that particular moment is not modified (original value (I) is used). If an activity was identified at a particular moment in the video content with a 100% accuracy, the original value of the interest curve has no impact on modified interest curve value at that particular moment. Instead, the value of the modified interest curve at that particular moment is the value of the activity-specific modifier value (A).

The activity-specific modifier value (A) may be calculated by:

$$A = A_{raw} \cdot (1 - H_{norm}^2), \quad A_{raw} = \sum_{x \in X} \text{boost}(x) \cdot p(x),$$

$$H_{norm} = \frac{-\sum_{x \in X} p(x) \log p(x)}{\log N_{classes}},$$

where A=activity-specific modifier value, $A_{raw}$=raw fine-grained activity-specific modifier value, $H_{norm}$=normalized entropy of the sub-activity distribution, $N_{classes}$=number of identified sub-activities, p(x)=predicted distribution of the sub-activities, boost(x)=multiplier applied to the predicted probability of the sub-activities action, and variable x ranges over each sub-activities in the predicted distribution.

The activity-specific modifier value may be calculated based on the fine-grained sub-activity distribution and/or other information. Identification of the sub-activities (prediction accuracy/confidence score) may be represented using a vector (prediction vector). The prediction vector may add up to one (probabilities of the identified sub-activities add up to 1). Particular sub-activities may be assigned a boost (greater than one)/suppression value (less than one) and may be represented using a vector (boost/suppression vector). The boost/suppression values may be calculated empirically to provide certain boost value(s) for desired/interesting sub-activities (e.g., 2.0 for standing on a surfboard) and certain suppression value(s) for not desired/uninteresting sub-activities (e.g., 0.1 for paddling).

The activity specific modifier value may be calculated by (1) taking a dot product of the prediction vector for the sub-activities and the boost/suppression vector, which results in a raw fine-grained activity-specific modifier value ($A_{raw}$), and (2) modifying the raw fine-grained activity-specific modifier value by taking into account the entropy of the distribution ($H_{norm}$). The entropy of the distribution ($H_{norm}$) may modify the raw fine-grained activity-specific modifier value based on the degree of unimodality of the identified sub-activities probability distribution. The entropy of the distribution ($H_{norm}$) may be normalized (e.g., between zero and one) such that the minimum entropy value is zero (when there is a single predicted sub-activity) and the maximum entropy value is one (the distribution of predicted sub-activities is flat). Using the entropy value provides for modification of the interest curve value that reduces the impact of the boost/suppression associated with the particular sub-activities when the entropy is high (the fine-grained classifier result does not have high confidence). Using the square of the normalized entropy to calculate the activity-specific modifier value (A) may decrease the effect of the raw fine-grained activity-specific modifier value ($A_{raw}$) on the activity-specific modifier value (A) when the predicted sub-activities distribution is flatter.

In some implementations, the metric component 110 may be configured to determine one or more emotion metric modifiers for the interest curve at one or more moments in the progress length based on the emotion(s) captured within the video content and/or other information. For example, particular emotion may be assigned a boost (greater than one)/suppression value (less than one) and may be represented using a vector (boost/suppression vector). The boost/suppression values may be calculated empirically to provide certain boost value(s) for desired/interesting emotions and certain suppression value(s) for not desired/uninteresting emotions. For example, the boost/suppression values for example emotions may include: 1.25 for anger; 1.25 for disgust; 3.0 for fear; 3.0 for happy; 0.5 for sad; 3.0 for surprise; 1.25 for neutral; and/or other values. The emotion metric modifier(s) (E) may be equal to or determined based on the boost/suppression values.

In some implementations, the emotion metric modifier(s) may be determined further based on the accuracy of the emotion identification (emotion accuracy) and the probability distribution of the emotion identification. For example, a particular type of emotion may be associated with sub-emotions. Coarse and fine-grained classifier (as discussed above with respect to activity and sub-activities) may be used to determine emotion metric(s) based on one or more of identification, accuracy, probability distribution, unimodality, and/or other information.

In some implementations, the metric component 110 may be configured to determine an orentation metric modifier for the interest curve at one or more moments in the progress length based on the orientation of the image sensor(s) that captured the video content and/or other information. The orientation metric modifier may reflect whether the image sensor(s) were correctly oriented at the time of video content capture. The orientation metric modifier may modify (e.g., suppress) values of an interest curve based on a determination that the image sensor(s) that captured the video content was incorrectly oriented at the time of video content capture. For example, the input for the orientation metric modifier calculation may include a probability distribution [x_0, x_90, x_180] for each of the orientation classes. In some implementations, x_0 and x_180 may be added together if it is difficult to differentiate between the two orientations. The normalized exponential moving average of the values (e.g., x_0+x_180) may be used as a multiplier (O) for the values of the interest curve.

The interest curve component 112 may be configured to modify the interest curve at one or more moments based on one or more metric modifiers and/or other information. Modifying the interest curve may include increasing values and/or decreasing values of the interest curve corresponding to different moments within the video content. For example, the interest curve may be modified to (1) include new peak(s), (2) include new dip(s), (3) increase value(s) of existing peak(s), (4) increase value(s) of existing dip(s), (5) decrease value(s) of existing peak(s), (6) decrease value(s) of existing dip(s), and/or other changes.

The interest curve component 112 may modify the interest curve based on the activity metric modifier and/or other information: I'=(1−maxC)·I+maxC·A, where I'=modified interest curve value; I=original interest curve value (e.g., base measure of interest); maxC=the highest predicted activity (e.g., maximum prediction accuracy of the captured activity from the coarse-grained classifier, for example, 0.60 for 60% accuracy in prediction of a surfing activity); and A=activity-specific modifier value.

For example, FIG. 5 illustrates an example modified interest curve 500. The modified interest curve 500 may be generated based on modification of one or more values of the interest curve 300. For example, at moment 321, the value of the interest curve 300 may be suppressed based on the video content including capture of paddling 311. At moment 322, the value of the interest curve 300 may be boosted based on the video content including capture of standing on a surfboard 312. At moment 323, the value of the interest curve 300 may be boosted based on the video content including capture of entering a wave tunnel 313. At moment 324, the value of the interest curve 300 may be boosted based on the video content including capture of falling 314. Other modifications of interest curves are contemplated.

In some implementations, the interest curve component 112 may modify the interest curve further based on the emotion metric modifier (e.g., multiplying I' by the emotion metric multiplier (E)). In some implementations, the interest curve component 112 may modify the interest curve further based on the orientation metric modifier (e.g., multiplying I' by the orientation metric multiplier (O)). For example, modification of the interest curve further based on the emotion metric modifier and the orientation metric modifier may be given by: I''=O·E·I'. Other combinations of activity metric modifier, emotion metric modifier, orientation metric modifier, and/or other information are contemplated to modify the interest curve.

In some implementations, changes between the original interest curve and the modified interest curve may be used for video content analysis/editing/sharing. The changes between the original interest curve and the modified interest curve may be used to identify portions within the video content for automatic/suggested analysis, editing, and/or sharing. For example, referring to FIG. 5, the changes between the interest curve 300 and the modified interest curve 500 may indicate that an existing peak at moment 323 was boosted while a new peak was created at moment 324 in the modified interest curve 500. The video content at moment 323 may be of more interest to a user than the video content at moment 324—boosting of an existing peak may indicate that the video content at moment 324 includes capture with a good "base measure" as well as a good activity-specific measure. Other uses of the differences between the original interest curve and the modified interest curve are contemplated.

In some implementations, video content may include one or more of spherical video content, virtual reality content, and/or other video content. Spherical video content and/or virtual reality content may define visual content viewable from one or more points of view as a function of progress through the spherical/virtual reality video content.

Spherical video content may refer to a video capture of multiple views from a single location. Spherical video content may include a full spherical video capture (360 degrees of capture) or a partial spherical video capture (less than 360 degrees of capture). Spherical video content may be captured through the use of one or more cameras/image sensors to capture images/videos from a location. The captured images/videos may be stitched together to form the spherical video content.

Virtual reality content may refer to content that may be consumed via virtual reality experience. Virtual reality content may associate different directions within the virtual reality content with different viewing directions, and a user may view a particular directions within the virtual reality content by looking in a particular direction. For example, a user may use a virtual reality headset to change the user's direction of view. The user's direction of view may correspond to a particular direction of view within the virtual reality content. For example, a forward looking direction of view for a user may correspond to a forward direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video capture from a path taken by the capturing device(s) in the moving position. For example, spherical video content and/or virtual reality content may include video capture from a person walking around in a music festival.

While the description herein may be directed to video content, one or more other implementations of the system/method described herein may be configured for other types media content. Other types of media content may include one or more of audio content (e.g., music, podcasts, audio books, and/or other audio content), multimedia presentations, images, slideshows, visual content (one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although the processor 11 and the electronic storage 12 are shown to be connected to the interface 13 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which the processor 11 comprises multiple processing units, one or more of computer program components may be located remotely from the other computer program components.

While the computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, the processor 11 may be configured to execute one or more additional computer program components that may perform some or all of the functionality attributed to one or more of computer program components described herein.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

The electronic storage media of the electronic storage 12 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 12 may be a separate component within the system 10, or the electronic storage 12 may be provided integrally with one or more other components of the system 10 (e.g., the processor 11). Although the electronic storage 12 is shown in FIG. 1 as a single entity, this is for illustrative purposes only. In some implementations, the electronic storage 12 may comprise a plurality of storage units. These storage units may be physically located within the same device, or the electronic storage 12 may represent storage functionality of a plurality of devices operating in coordination.

Figure 2:
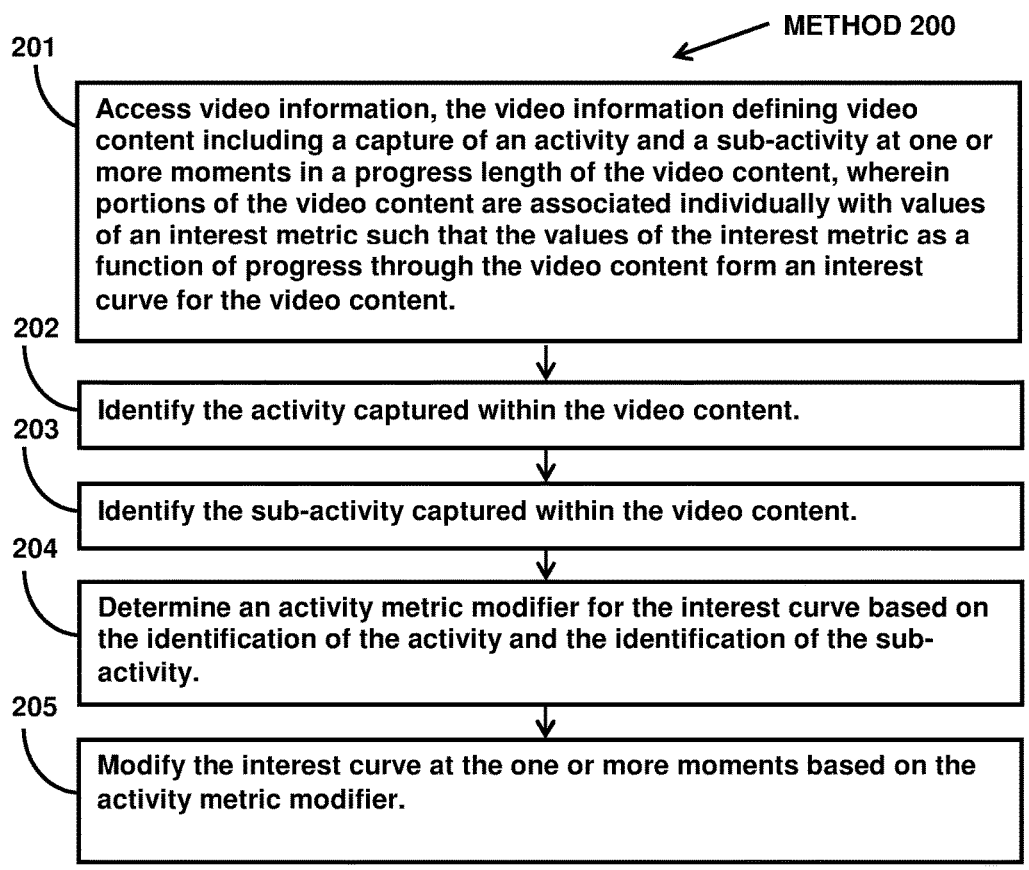
FIG. 2 illustrates an example method for identifying interesting moments within videos.

FIG. 2 illustrates method 200 for identifying interesting moments within videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, video information defining video content may be accessed. The video content may have a progress length and may include a capture of an activity at one or more moments in the progress length. The capture of the activity may include a capture of a sub-activity associated with the activity. Portions of the video content may be associated individually with values of an interest metric such that the values of the interest metric of the individual portions of the video content as a function of progress through the video content form an interest curve for the video content. In some implementation, operation 201 may be performed by a processor component the same as or similar to the video information component 102 (Shown in FIG. 1 and described herein).

At operation 202, the activity captured within the video content may be identified. In some implementations, operation 202 may be performed by a processor component the same as or similar to the activity component 104 (Shown in FIG. 1 and described herein).

At operation 203, the sub-activity captured within the video content may be identified. In some implementations, operation 203 may be performed by a processor component the same as or similar to the activity component 104 (Shown in FIG. 1 and described herein).

At operation 204, an activity metric modifier for the interest curve at the one or more moments in the progress length may be determined based on the identification of the activity and the identification of the sub-activity. In some implementations, operation 204 may be performed by a processor component the same as or similar to the metric component 110 (Shown in FIG. 1 and described herein).

At operation 205, the interest curve may be modified at the one or more moments based on the activity metric modifier. In some implementations, operation 205 may be performed by a processor component the same as or similar to the interest curve component 112 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for identifying interesting moments within videos, the system comprising:
   one or more physical processors configured by machine readable instructions to:
      access video information defining video content, the video content having a progress length and including a capture of an activity at one or more moments in the progress length, the capture of the activity including a capture of a sub-activity associated with the activity, wherein portions of the video content are associated individually with values of an interest metric such that the values of the interest metric of the individual portions of the video content as a function of progress through the video content form an interest curve for the video content;
      identify the activity captured within the video content;
      identify the sub-activity captured within the video content based on the identification of the activity;
      determine an activity metric modifier for the interest curve at the one or more moments in the progress length based on the identification of the activity and the identification of the sub-activity; and
      modify the interest curve at the one or more moments based on the activity metric modifier.

2. The system of claim 1, wherein:
   the activity is identified with an activity accuracy;
   the sub-activity is identified with a sub-activity accuracy; and
   the activity metric modifier is determined further based on the activity accuracy and the sub-activity accuracy.

3. The system of claim 2, wherein the identification of the sub-activity is characterized by a probability distribution, and the activity metric modifier is determined further based on the probability distribution.

4. The system of claim 3, wherein the probability distribution includes identification of a set of sub-activities associated with the activity and accuracies associated with the identification of individual sub-activities.

5. The system of claim 4, wherein the individual sub-activities are associated with individual modifier values.

6. The system of claim 3, wherein the probability distribution is characterized by a degree of unimodality, and the activity metric modifier is determined further based on the degree of unimodality.

7. The system of claim 2, wherein the one or more physical processors are further configured to:
   identify an emotion captured within the video content at the one or more moments in the progress length;
   determine an emotion metric modifier for the interest curve at the one or more moments in the progress length based on the emotion; and
   modify the interest curve at the one or more moments further based on the emotion metric modifier.

8. The system of claim 7, wherein:
   the emotion is identified with an emotion accuracy;
   the identification of the emotion is characterized by a probability distribution; and
   the emotion metric modifier is determined further based on the emotion accuracy and the probability distribution.

9. The system of claim 7, wherein the video content is captured by an image sensor and the one or more physical processors are further configured to:

determine an orientation of the image sensor when the image sensor captured the activity at the one or more moments in the progress length;

determine an orientation metric modifier for the interest curve at the one or more moments in the progress length based on the orientation; and modify the interest curve at the one or more moments further based on the orientation metric modifier.

10. A method for identifying interesting moments within videos, the method comprising:

accessing video information defining video content, the video content having a progress length and including a capture of an activity at one or more moments in the progress length, the capture of the activity including a capture of a sub-activity associated with the activity, wherein portions of the video content are associated individually with values of an interest metric such that the values of the interest metric of the individual portions of the video content as a function of progress through the video content form an interest curve for the video content;

identifying the activity captured within the video content;

identifying the sub-activity captured within the video content based on the identification of the activity;

determining an activity metric modifier for the interest curve at the one or more moments in the progress length based on the identification of the activity and the identification of the sub-activity; and modifying the interest curve at the one or more moments based on the activity metric modifier.

11. The method of claim 10, wherein:

the activity is identified with an activity accuracy;

the sub-activity is identified with a sub-activity accuracy; and the activity metric modifier is determined further based on the activity accuracy and the sub-activity accuracy.

12. The method of claim 11, wherein the identification of the sub-activity is characterized by a probability distribution, and the activity metric modifier is determined further based on the probability distribution.

13. The method of claim 12, wherein the probability distribution includes identification of a set of sub-activities associated with the activity and accuracies associated with the identification of individual sub-activities.

14. The method of claim 13, wherein the individual sub-activities are associated with individual modifier values.

15. The method of claim 12, wherein the probability distribution is characterized by a degree of unimodality, and the activity metric modifier is determined further based on the degree of unimodality.

16. The method of claim 11, further comprising:

identifying an emotion captured within the video content at the one or more moments in the progress length;

determining an emotion metric modifier for the interest curve at the one or more moments in the progress length based on the emotion; and modifying the interest curve at the one or more moments further based on the emotion metric modifier.

17. The method of claim 16, wherein:

the emotion is identified with an emotion accuracy;

the identification of the emotion is characterized by a probability distribution; and the emotion metric modifier is determined further based on the emotion accuracy and the probability distribution.

18. The method of claim 16, wherein the video content is captured by an image sensor, the method further comprising:

determining an orientation of the image sensor when the image sensor captured the activity at the one or more moments in the progress length;

determining an orientation metric modifier for the interest curve at the one or more moments in the progress length based on the orientation; and modifying the interest curve at the one or more moments further based on the orientation metric modifier.

19. A system for identifying interesting moments within videos, the system comprising:

one or more physical processors configured by machine readable instructions to:

access video information defining video content, the video content having a progress length and including a capture of an activity at one or more moments in the progress length, the capture of the activity including a capture of a sub-activity associated with the activity, wherein portions of the video content are associated individually with values of an interest metric such that the values of the interest metric of the individual portions of the video content as a function of progress through the video content form an interest curve for the video content;

identify the activity captured within the video content, wherein the activity is identified with an activity accuracy;

identify the sub-activity captured within the video content based on the identification of the activity, wherein the sub-activity is identified with a sub-activity accuracy and the identification of the sub-activity is characterized by a first probability distribution having a degree of unimodality;

determine an activity metric modifier for the interest curve at the one or more moments in the progress length based on the identification of the activity and the identification of the sub-activity, wherein the determination of the activity metric modifier based on the identification of the activity and the identification of the sub-activity includes a determination based on the activity accuracy, the sub-activity accuracy, the first probability distribution, and the degree of unimodality; and modify the interest curve at the one or more moments based on the activity metric modifier.

20. The system of claim 19, wherein the one or more physical processors are further configured to:

identify an emotion captured within the video content at the one or more moments in the progress length;

determine an emotion metric modifier for the interest curve at the one or more moments in the progress length based on the emotion; and modify the interest curve at the one or more moments further based on the emotion metric modifier.

* * * * *